United States Patent Office 3,791,963
Patented Feb. 12, 1974

3,791,963
HYDROTHERMAL METHOD FOR MANUFACTURING A NOVEL CATALYTIC MATERIAL, CATALYSTS CONTAINING SAID MATERIAL, AND PROCESSES USING SAID CATALYSTS
Joseph Jaffe, Berkeley, Calif., assignor to Chevron Research Company, San Francisco, Calif.
No Drawing. Continuation-in-part of application Ser. No. 763,922, Sept. 30, 1968, now Patent No. 3,652,457. This application May 20, 1970, Ser. No. 39,173
The portion of the term of the patent subsequent to Mar. 28, 1989, has been disclaimed
Int. Cl. C10g 11/02; B01j 11/40
U.S. Cl. 208—111
11 Claims

ABSTRACT OF THE DISCLOSURE (a) Method for manufacturing a novel catalytic material having a surface area above 200 square meters per gram, a bulk density below 0.85 grams per cc. and a particle density below 1.6 grams per cc., said catalytic material comprising a novel synthetic layered crystalline clay-type aluminosilicate mineral in an intimate admixture with an amorphous cogel comprising silica and alumina, said material being useful as a catalytic cracking catalyst and as a cracking component of a catalyst containing at least one additional component, said method comprising subjecting to autoclave conditions of elevated temperature and pressure a hydrogel or hyrogel slurry, said slurry comprising water, a component selected from fluorine and compounds of fluorine, and an amorphous cogel comprising oxides or hydroxides of silicon and aluminum, said silicon and aluminum preferably being present in said cogel in a silicon-to-aluminum atomic ratio above 1.65, said elevated temperature being in the range 340° to 700° F., for a time not more than any of the times ranging linearly from 36 hours at 340° F. to 6 hours at 700° F., whereby a substantial amount of said synthetic mineral is formed, in an intimate admixture with a substantial amount of unreacted amorphous cogel comprising compounds of silicon and aluminum, and drying said intimate admixture to produce said novel catalytic material; (b) the novel catalytic material so manufactured, comprising said synthetic mineral in said intimate admixture with unreacted amorphous cogel, preferably containing at least 10 weight percent of said unreacted amorphous cogel; (c) catalysts comprising said novel catalytic material; and (d) hydrocarbon conversion processes using said catalysts.

RELATED APPLICATION

This application is a continuation-in-part of Joseph Jaffe application Ser. No. 763,922, filed Sept. 30, 1968 and now U.S. Pat. No. 3,652,457.

INTRODUCTION

This application relates to a novel catalytic material comprising a novel synthetic layered crystalline clay-type alumino-silicate mineral, to a method for manufacturing said material, to catalysts comprising said material, and to hydrocarbon conversion processes using said catalysts.

PRIOR ART

It is known, particularly from Granquist U.S. Pat. 3,252,757, that is a relatively new layered crystalline aluminosilicate clay-type mineral that has been synthesized has the empirical formula $$nSiO_2:Al_2O_3:mAB:xH_2O$$

where the layer lattices comprise said silica, said alumina, and said B, and where $n$ is from 2.4 to 3.0
$m$ is from 0.2 to 0.6
A is one equivalent of an exchangeable cation having a valence not greater than 2, and is external to the lattice,
B is chosen from the group of negative ions which consists of $F^-$, $OH^-$, $\frac{1}{2}O^{--}$ and mixtures thereof, and is internal in the lattice, and
$x$ is from 2.0 to 3.5 at 50% relative humidity, said mineral being characterized by a $d_{001}$ spacing at said humidity within the range which extends from a lower limit of about 10.4 angstroms to an upper limit of about 12.0 angstroms when A is monovalent, to about 14.7 angstroms when A is divalent, and to a value intermediate between 12.0 angstroms and 14.7 angstroms when A includes both monovalent and divalent cations. The equivalent of an exchangeable cation, A, in said mineral, may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said synthetic layered crystalline aluminosilicate mineral of said Granquist patent is known from U.S. Pat. 3,252,889 to have application in calcined form as a component of a catalytic cracking catalyst, and applications of said layered aluminosilicate in calcined form as a component of a hydrocracking catalyst have been disclosed in copending applications Ser. Nos. 760,619, now U.S. Pat. 3,535,228, and 750,038, now U.S. Pat. 3,535,233.

Said layered mineral of said Granquist patent is a randomly interstratified montmorillonite-mica, that is, one containing randomly alternating montmorillonite and mica layers. It expands upon glycerol treatment, and irreversibly collapses to a mineralogically different mineral species upon calcination.

OBJECTS

In view of the foregoing, it is an object of the present invention to provide a novel catalytic material of improved characteristics, compared with the mineral of said Granquist patent, particularly for use as a component of a hydrocarbon conversion catalyst, said material comprising a novel synthetic crystalline clay-type aluminosilicate, to provide a method for making said material, to provide catalysts comprising said material, and to provide hydrocarbon conversion processes using said catalysts.

STATEMENT OF INVENTION

In accordance with the present invention, there is provided a method for manufacturing a novel catalytic material comprising a synthetic layered crystalline clay-type aluminosilicate in an intimate admixture with amorphous cogel comprising silica and alumina, which comprises forming a hydrogel or hydrogel slurry reaction mixture comprising water, a component selected from fluorine and compounds of fluorine, an amorphous cogel comprising oxides or hydroxides of silicon and aluminum, said silicon and aluminum preferably being present in said cogel in a silicon-to-aluminum atomic ratio above 1.65, said amorphous cogel preferably being present in said hydrogel or hydrogel slurry in an amount of 5 to 50 weight percent, preferably 5 to 25 weight percent, and subjecting said reaction mixture, preferably at a pH of 6 to 10, in a conversion zone to autoclave conditions at elevated temperature and pressure, said temperature being in the range 340° to 700° F., for a time not more than any of the times ranging linearly from 36 hours at 340° F. to 6 hours at 700° F., whereby a substantial amount of a layered crystalline clay-type aluminosilicate mineral is formed, in intimate admixture with a substantial amount of unreacted cogel comprising oxides or hydroxides of silicon and aluminum, and drying said intimate admixture to produce said catalytic material comprising said mineral in an intimate admixture with amorphous cogel comprising silica and alumina, said catalytic material having a surface area above 200 square meters per gram, a bulk density below 0.85 gram per cc. and a particle density below 1.6 grams per cc., said catalytic material preferably comprising at least 10 weight percent of amorphous cogel. Preferred reaction temperatures, pressures and times are given below. After the desired quantity of synthetic crystalline aluminosilicate mineral forms, the resulting slurry comprising said mineral and also comprising unconverted amorphous gel, is dried, to produce the novel catalytic material comprising said mineral, said catalytic material being useful as a catalytic cracking catalyst or cracking component of a catalyst containing at least one additional component. The desired quantity of crystalline mineral formed preferably is that quantity which will result in 5 to 90 weight percent, preferably 20 to 70 weight percent, thereof in the final dried catalytic material. Said material, comprising said crystalline mineral in intimate admixture with unreacted amorphous cogel comprising silica and alumina, will have a surface area of 200 to 380 m.$^2$/g. Said material, prior to or after calcining, may be impregnated with at least one catalytic hydrogenating component precursor compound to form a hydroprocessing catalyst. Said material may be calcined and used as such as a catalytic cracking catalyst, or combined with other catalytic cracking components.

The initial reaction mixture may contain a cation selected from the group consisting of ammonium, cadmium, lithium, potassium, calcium, barium and strontium, and mixtures thereof. The cation preferably is ammonium.

Preferably the catalytic material produced by the process of the present invention, as such or in catalysts containing said material, is not subjected to a calcination temperature exceeding 1150° F. prior to being used for catalytic purposes.

The synthetic layered crystalline clay-type aluminosilicate mineral that is formed by crystallization during the process of the present invention, preferably has a silica/alumina molar ratio above 3.0, which it will have when the cogel starting material comprising silicon and aluminum compounds has a silicon/aluminum atomic ratio above 1.65. When that mineral, or the catalytic material referred to herein comprising said mineral and unreacted amorphous cogel, is dried and calcined, the $d_{001}$ spacing of said mineral may be different than it was prior to drying and calcining. However, said mineral, prior to drying and calcining, has the following formula when the cogel starting material comprising silica and alumina has a silicon/aluminum atom ratio above 1.65:

$$nSiO_2:Al_2O_3:mAB:xH_2O$$

where the layer lattices comprise said silica, said alumina, and said B, and where $n$ is more than 3.0
$m$ is from 0.2 to 0.6
A is one equivalent of an exchangeable cation having a valence not greater than 2, and is external to the lattice,
B is chosen from the group of negative ions which consists of F$^-$, OH$^-$, ½O$^{--}$ and mixtures thereof, and is internal in the lattice, and
$x$ is from 2.0 to 3.5 at 50% relative humidity, said mineral being characterized by a $d_{100}$ spacing at said humidity which is between 10.25 angstroms and 10.4 angstroms when A is monovalent. The equivalent of an exchangeable cation, A, in said mineral may be chosen from the group consisting of H$^+$, NH$_4^+$, Li$^+$, K$^+$, ½Ca$^{++}$, ½Mg$^{++}$, ½Sr$^{++}$, and ½Ba$^{++}$, and mixtures thereof.

Preferably the hydrogel or hydrogel slurry is washed with dilute ammonium acetate and water before being subjected to the elevated temperature and pressure treatment of the process of the present invention.

The hydrogel or hydrogel slurry may be prepared in any convenient manner, using suitable precursor compounds of the final components of the desired catalyst. A suitable general procedure for forming the hydrogel or hydrogel slurry may be found in Joseph Jaffe U.S. Pat. 3,280,040. Precursor compounds of the aluminum oxide or hydroxide component of the amorphous gel portion of the slurry preferably are chlorides. Precursor compounds of the silicon oxide or hydroxide component of the amorphous gel portion of the slurry preferably are alkali metal silicates.

Said catalytic hydrogenating component precursor compound is selected from compounds of nickel, cobalt, platinum, palladium and rhenium. In addition to impregnation with said precursor compound, said material comprising said mineral advantageously may be impregnated with at least one catalytic hydrogenating component precursor compound selected from compounds of tungsten, molybdenum, tin and zinc.

Any one or more of the elements contained in the aforementtioned catalytic hydrogenating component precursors may be present in a desired final hydroprocessing catalyst, in the form of metals, oxides, sulfides or any combination thereof, in amounts selected from the following list, based on the total catalyst, calculated as metals:

| Element: | Weight percent |
|---|---|
| Ni or Co | 1–20 |
| Pt or Pd | 0.01–2.0 |
| Re | 0.01–2.0 |
| W or Mo | 5–35 |
| Sn or Zn | 0.1–10 |

It has been found that the presence of tin, in the metal, oxide or sulfide form, particularly in combination with nickel, in a hydroprocessing catalyst according to the present invention, results in higher hydrocracking activity and higher hydrogenation activity than would be exhibited by a catalyst that is identical except that contains no tin. Further, the presence of tin permits the hydrogenation activity to be controlled in an essentially reversible manner by varying the amount of sulfur present in the feed.

Particularly effective hydrogenating components and combinations of catalytic hydrogenating components in the final catalyst, in the form of metals, oxides or sulfides, are:

| Pt or Pd | Ni Mo or | CoMo | NiSn | PtRe |
|---|---|---|---|---|
| Ni or Co | NiW or | CoW | MoZn | PdRe |
| Re | | | | |

Said hydrogel or hydrogel slurry should contain fluorine or a compound of fluorine, in an amount which will provide fluorine or a compound of fluorine in the final catalyst cracking component material in an amount of 0.1–3 weight percent, preferably 0.5–3 weight percent, more preferably 0.5–2 weight percent, calculated as F.

Because the suitable hydrothermal conversion temperatures for forming the desired synthetic crystalline mineral from precursors thereof lie far above the normal boiling point of water, the hydrogel or hydrogel slurry conveniently is subjected to said conditions of elevated temperature and pressure in a pressure vessel, so that the water contained therein will remain in the liquid state by autoclave action. The hydrogel or hydrogel slurry is maintained at the selected temperature and pressure for a sufficient period of time for the formation of the desired crystalline aluminosilicate to the desired extent. Temperatures are 340° to 700° F., and pressures are above 500 p.s.i.g., preferably above 900 p.s.i.g. The temperatures at which the formation of the desired crystalline aluminosilicate takes place is in the practical range 530° to 700° F., with about 545° F. being optimum. The pressure need not be appreciably in excess of the autoclave pressure of the hydrogel or hydrogel slurry, i.e., that developed by the vapor pressure of the water itself. The latter is only negligibly changed by the dissolved material in the hydrogel or hydrogel slurry, because the bulk of the solids therein is not in a form which appreciably changes the vapor pressure. Therefore, the ordinary tabulations of steam pressure may be used. Accordingly, at 545° F. the pressure developed is around 1000 p.s.i.g.

The reaction time may vary from 0.1 to 36 hours, depending upon the reaction temperature, pressure and degree of conversion of the hydrogel or hydrogel slurry to said clay-type aluminosilicate that is desired. With lower reaction temperatures longer reaction times are required for a given degree of conversion, and vice versa. Preferably a reaction time of 0.2 to 20 hours, more preferably 0.2 to 5 hours, and still more preferably 0.2 to 2 hours, is used.

When the hydrogel or hydrogel slurry has remained at the selected conditions of temperature and pressure for a sufficient time for the desired amount of the desired crystalline aluminosilicate to form, the mixture is allowed to cool, and the slurry containing said crystalline aluminosilicate is dried, for example at 200°–450° F. Thereafter, the dried material may be calcined for use as a catalytic cracking catalyst, or may be combined prior to or after calcining with any desired hydrogenation component or components to produce a hydroprocessing catalyst. When a hydroprocessing catalyst is so produced, it preferably is activated in an oxygen-containing gas stream, which may be air, at a temperature of 900° to 1150° F. for 0.5 to 20 hours, to produce the final solid catalyst. It has been found that optimum activity is developed in the catalyst if the activation temperature does not exceed 1150° F.

The hydroprocessing catalyst produced as described above may be used in such reactions as hydrofining and hydrocracking. Those skilled in the art will recognize which catalytic components the catalyst should contain for the particular reaction for which the catalyst will be used, and will be aware of the operating conditions at which the reaction should be conducted.

As an alternative to using the novel catalytic material produced as described above, in the manner described above, said material may be broken into particles, for example pulverized into a powder, and said particles may be dispersed in a hydrogel or hydrogel slurry comprising components selected from precursor compounds of alumina, silica, silica-alumina, silica-alumina-titania, and silica-alumina-zirconia, and the resulting mixture may be dried and activated, at the same conditions used for drying and activating the material of said particles, to form a catalyst composite material. The hydrogel or hydrogel slurry in which said particles are dispersed may contain any or all of the components of the hydrogel or hydrogel slurry used in making said particles, or may contain any components that the foregoing discussion indicates could have been contained in the hydrogel or hydrogel slurry used in making said particles. Additionally, the hydrogel or hydrogel slurry in which said particles are dispersed may contain particles of crystalline zeolitic molecular sieve, preferably "X" or "Y" type. Said molecular sieve desirably may be an ultra-stable molecular sieve, that is, one having a sodium content below 3 weight percent, calculated as $Na_2O$, a unit cell size below about 24.65 angstroms, and a silica/alumina ratio above about 2.15.

EXAMPLES

The following examples will aid in understanding the catalytic material preparation method of the present invention, and use of the catalytic material prepared thereby.

Example 1

A novel catalytic material, comprising a novel synthetic layered crystalline material in an intimate admixture with unreacted silica-alumina cogel, said material being useful as a catalytic cracking catalyst or a cracking component of a catalyst containing at least one additional component, is prepared from an amorphous cogelled precursor material of the following composition:

| Component | Wt. percent of total cogelled material, anhydrous basis | Weight ratio | Molar ratio |
| --- | --- | --- | --- |
| $SiO_2$ | 67 | 2.03 | 3.45 |
| $Al_2O_3$ | 33 | 1 | 1 |

The amorphous cogelled precursor material is prepared by the following steps, using sufficient quantities of the starting materials to produce the above-indicated weight percentages of the components of said cogelled precursor material.

(1) A aqueous acidic solution is prepared, containing $AlCl_3$ and acetic acid.

(2) A dilute sodium silicate solution is added to said acidic solution to form a clear dispersion of colloidal silica in $AlCl_3$ and acetic acid.

(3) An ammonium hydroxide solution is added to said clear dispersion to precipitate alumina and silica in the form of a hydrogel slurry, at a pH of 7–8.

(4) Ammonium bifluoride is added to said hydrogel slurry, in an amount sufficient to provide 0.1 to 3 weight percent fluoride in said hydrogel slurry, calculated as F, based on the silica and alumina in said hydrogel slurry. Instead of ammonium bifluoride, sodium fluoride or HF may be used in preparation of the material of the present invention.

(5) The slurry is filtered to produce a hydrogel filter cake. The filter cake is partially dried to about 25% solids content and is extruded into small pellets. The pellets are washed repeatedly with dilute ammonium acetate solution to remove sodium and chloride ionic impurities.

A slurry is formed from the washed hydrogel pellets and water, using sufficient water to provide a slurry solids content of 10 wt. percent. The slurry is loaded into an autoclave and there is aged for 0.5 to 2 hours at 1400 p.s.i.g. autogenous pressure (300° C.), resulting in a slurry containing a crystallized mineral, fluorine, and unreacted amorphous cogel, all in intimate admixture.

The autoclaved slurry is dried. X-ray diffraction and other examinations of the resulting material indicate the presence of unreacted amorphous cogel, fluorine, and a synthetic layered crystalline clay-type aluminosilicate, consisting predominantly of mica-like layers, all in intimate admixture. Upon treatment with glycerol the material does not swell, as does said Granquist synthetic aluminosilicate material. The material has a surface area of 300 square meters per gram, a bulk density of 0.8 gram per cc., and a particle density of 1.5 grams per cc.

Example 2

A portion of the material of Example 1 is calcined and used as a catalytic cracking catalyst.

Example 3

Another portion of the material of Example 1 is pulverized, moistened with a solution of palladium ammino nitrate and chromium nitrate, extruded into ⅛"-diameter pellets, dried and calcined to form a hydrocracking catalyst containing 0.5 weight percent palladium and 0.5 weight percent chromium. Said catalyst is used to hydrocrack a hydrofined California gas oil of the following description:

| | |
| --- | --- |
| Gravity, ° API | 34 |
| Aniline point, ° F. | 193 |
| Organic nitrogen, p.p.m. | 0.1 |
| Boiling range, ° F. | 550–850 |

The hydrocracking conditions are as follows:

| | |
|---|---|
| Liquid hourly space velocity, v./v./hr. | 2.0 |
| Per-pass conversion to products boiling below 400° F., vol. percent | 60 |
| Exit gas rate, s.c.f./bbl. | 5600 |
| Total pressure, p.s.i.g. | 1200 |

The starting temperature necessary to achieve the indicated per-pass conversion is 580° F. The catalyst fouling rate is 0.025° F. per hour.

What is claimed is:

1. A method of manufacturing a catalytic material useful in hydrocarbon conversion processes which comprises forming a hydrogel slurry reaction mixture containing an amorphous cogel comprising oxides or hydroxides of silicon and alumina, said hydrogel slurry further containing water and a component selected from fluorine and compounds of fluorine, subjecting said hydrogel slurry to a temperature in the range 340° to 700° F. in an autoclave for a time not more than any of the times ranging linearly from 36 hours at 340° F. to 6 hours at 700° F., whereby a substantial amount of a layered crystalline clay-type aluminosilicate mineral is formed in intimate admixture with a substantial amount of unreacted cogel comprising oxides or hydroxides of silicon and aluminum, said aluminosilicate mineral prior to drying and calcining having the formula $$n\text{SiO}_2 : \text{Al}_2\text{O}_3 : m\text{AB} : x\text{H}_2\text{O}$$

where the layer lattices comprise said silica, said alumina, and said B, and where $n$ is more than 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, said mineral being characterized by a $d_{001}$ spacing at said humidity which is between 10.25 angstroms and 10.4 angstroms when A is monovalent, and drying said intimate admixture to produce said catalytic material comprising said mineral in an intimate admixture with amorphous cogel comprising silica and alumina, said catalytic material having a surface area above 200 m.²/gram, a bulk density below 0.85 gram per cc., and a particle density below 1.6 grams per cc.

2. The method as in claim 1, wherein said catalytic material is calcined to produce a finished catalyst.

3. The method as in claim 1, wherein said catalytic material is impregnated with a compound selected from compounds of nickel, cobalt, platinum, palladium and rhenium, and the resulting impregnated composite is dried and calcined to produce a finished catalyst.

4. The method as in claim 3, wherein said composite is dried and calcined at temperatures not exceeding 1150° F.

5. The method as in claim 1, wherein said hydrogel slurry is subjected to said temperature and said pressure for a period of 0.2 to 20 hours.

6. The method as in claim 1, with the additional steps of breaking said solid catalytic material into particles and dispersing said particles in a hydrogel or hydrogel slurry comprising components selected from precursor compounds of alumina, silica, silica-alumina, silica-alumina-titania, and silica-alumina-zirconia, and drying and calcining the resulting mixture to form a catalyst composite.

7. The method as in claim 3, wherein said composite prior to calcining is impregnated with at least one catalytic hydrogenating component precursor compound selected from compounds of tungsten, molybdenum, tin and zinc.

8. A catalytic material useful in hydrocarbon conversion processes comprising a crystalline layered clay-type aluminosilicate mineral in intimate admixture with an amorphous gel comprising silica and alumina, said aluminosilicate mineral prior to drying and calcining having the formula $$n\text{SiO}_2 : \text{Al}_2\text{O}_3 : m\text{AB} : x\text{H}_2\text{O}$$

where the layer lattices comprise said silica, said alumina, and said B, and where $n$ is more than 3.0

$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50% relative humidity, said mineral being characterized by a $d_{001}$ spacing at said humidity which is between 10.25 angstroms and 10.4 angstroms when A is monovalent, said catalytic material having a surface area above 200 square meters per gram, a bulk density below 0.85 gram per cc., and a particle density below 1.6 grams per cc., said amorphous gel being present in said catalytic material in an amount of at least 10 weight percent.

9. A catalyst comprising the catalytic material of claim 8, and further comprising at least one hydrogenating component.

10. A hydrocarbon conversion process using a catalyst comprising the catalytic material of claim 8.

11. A hydrocarbon conversion process using the catalyst of claim 9.

References Cited

UNITED STATES PATENTS

| | | | |
|---|---|---|---|
| 3,252,757 | 5/1966 | Granquist | 252—455 X |
| 3,140,253 | 7/1964 | Plank et al. | 252—455 X |
| 2,914,464 | 11/1959 | Burton et al. | 208—111 X |

CARL F. DEES, Primary Examiner

U.S. Cl. X.R.

252—442, 455 R